United States Patent [19]

Endo et al.

[11] Patent Number: 4,954,889
[45] Date of Patent: Sep. 4, 1990

[54] COLOR MASKING CIRCUIT AND COLOR VIDEO PRINTER USING THE SAME

[75] Inventors: Kunio Endo; Tadashi Katsukawa, both of Osaka, Japan

[73] Assignee: NEC Home Electronics Ltd., Osaka, Japan

[21] Appl. No.: 443,880

[22] Filed: Nov. 30, 1989

Related U.S. Application Data

[63] Continuation of Ser. No. 188,464, Apr. 29, 1988, abandoned.

[30] Foreign Application Priority Data

Apr. 30, 1987 [JP] Japan .................................. 62-106940
Jun. 30, 1987 [JP] Japan .................................. 62-162643

[51] Int. Cl.$^5$ .............................................. H04N 1/46
[52] U.S. Cl. ......................................... 358/80; 358/75
[58] Field of Search ................................... 358/75, 80

[56] References Cited

U.S. PATENT DOCUMENTS

| | | | |
|---|---|---|---|
| 4,740,833 | 4/1988 | Shiota et al. | 358/80 |
| 4,745,466 | 5/1988 | Yoshida et al. | 358/80 |
| 4,751,535 | 6/1988 | Myers | 346/157 |
| 4,789,892 | 12/1988 | Tsuzuki et al. | 358/80 |
| 4,796,086 | 1/1989 | Ohta et al. | 358/80 |
| 4,811,239 | 3/1989 | Tsao | 364/519 |
| 4,814,867 | 3/1989 | Tsuda et al. | 358/80 |
| 4,814,891 | 3/1989 | Uchiyama et al. | 358/296 |
| 4,819,193 | 4/1989 | Imao | 364/526 |
| 4,829,323 | 5/1989 | Suzuki et al. | 346/140 R |

Primary Examiner—James J. Groody
Assistant Examiner—Robert M. Bauer
Attorney, Agent, or Firm—Cushman, Darby & Cushman

[57] ABSTRACT

A color masking circuit and a color printer incorporating the color masking circuit which performs color masking processing upon color density data to indicate the density of the color picture elements. The color masking circuit includes a matrix coefficient table for holding predetermined matrix coefficients which are used in the masking of the inputted color density data. A matrix coefficient selector selects predetermined matrix coefficients from the matrix coefficient table according to the color density data correction to be performed. Multiplication and adder circuits are also provided for calculating the corrected color density data in accordance with the selected matrix coefficients. However, the matrix coefficients may be taken directly from a look-up table by addressing the table with the color density data to be corrected.

4 Claims, 6 Drawing Sheets

COLOR MASKING CIRCUIT AND COLOR VIDEO PRINTER USING THE SAME

This is a continuation of application No. 07/188,464, filed Apr. 29, 1988, which was abandoned upon the filing hereof.

BACKGROUND OF THE INVENTION

The present invention relates to a color video printer for printing a color television picture and a color masking circuit for use in a color video printer or the like, and particularly relates to a color masking circuit which performs high-speed color masking processing to eliminate color impurities included in the color material and the like so as to obtain a printed picture with high color reproducibility.

A color video printer for fixing and recording a color television picture as a hard copy has become widely used in various fields as an alternative to photography or some other printing technique. There are various color video printers available which utilize different recording systems such as thermal transfer, ink-jets, light-spot scanning, etc. In any recording system, however, color reproduction is achieved by mixing the three colors of yellow (Y), magenta (M) and cyan (C) using a subtractive color process.

In thermal transfer printing of a sheet of printed matter, it is easy to obtain a superimposed color picture by switching color ink ribbons of the colors (Y), (M) and (C). Recently, therefore, a full-color video printer in which density gradation is given to respective picture elements (recording dots) has been developed and is expected to be used as an external output apparatus (a hard-copy device) to be connected to a video receiver, a picture processing device, a personal computer and so on. In controlling the density gradation, a constant voltage is applied to each of the heating resistors of a thermal head and current conduction time to the resistors is controlled to thereby cause the heating energy of the resistors to be different so as to give gradation to the transfer quantity of a color material (ink) to recording dots, that is, to give density gradation to picture elements.

In the conventional color video printer, however, the color reproducibility of printed pictures has not been superior. This is mainly because the colors (Y, M and C) of general color materials are not pure but include impurities. Therefore, if those primary colors are superimposed on a printed paper, the mixed color thereon shifts from the color of the original picture.

SUMMARY OF THE INVENTION

It is therefore an object of the present invention to solve the foregoing problems in the prior art.

It is another object of the present invention to provide a color masking circuit in which a high-speed color masking processing is performed so as to eliminate color impurities included in color materials and the like to thereby improve the color reproducibility.

The foregoing objects of the present invention are attained by a color masking circuit which performs color masking processing upon density data to indicate the density of color picture elements.

The color masking circuit comprises a matrix coefficient holding means for holding predetermined matrix coefficients for execution of a matrix operation, a matrix coefficient selecting means for selecting predetermined matrix coefficients from the matrix coefficient holding means according to desired output density data, multiplication circuits for multiplying the density data for respective colors by the selected matrix coefficients, and an addition circuit for adding the data obtained as resultant products from the multiplication circuits to each other to thereby produce the desired output density data.

In a color video printer according to the present invention, the picture element data forming a television picture is converted into density data, and the density data is subject to color masking processing by the above-mentioned color masking circuit to thereby obtain corrected density data. The thus obtained corrected density data is then converted into density gradation data for instructing density gradation of each picture element, and driving of the picture printing in accordance with the gradation data is performed to thereby form a printed picture corresponding to the television picture.

DETAILED DESCRIPTION OF THE PREFERRED EMBODIMENTS

Picture element data forming a color television picture is composed of picture elements $P_B$, $P_G$ and $P_R$ for the respective colors of blue (B), green (G) and red (R). The density data $D_B$, $D_G$ and $D_R$ corresponding to those picture elements $P_B$, $P_G$ and $P_R$ are given by the following equations:

$$D_B = -\log P_B$$
$$D_G = -\log P_G$$
$$D_R = -\log P_R$$

1

In the case of ideal color materials having pure colors (Y, M and C), the following relationships are established:

$$D_Y = D_B$$
$$D_M = D_G \quad\quad 2$$
$$D_C = D_R$$

In the conventional video printer, adhering quantities of the respective color materials onto the surface of a print paper has been controlled on the basis of the density data $D_Y$, $D_M$ and $D_C$ obtained by the above equations 1 and 2. However, since the actual colors of color materials include impure components, the color reproducibility becomes low in the printed picture if the printing is performed on the basis of the data $D_Y$, $D_M$ and $D_C$ for the colors (Y), (M) and (C) obtained by the equations 2.

Therefore, according to the present invention, by way of example, the following linear color masking processing is performed upon the density data $D_B$, $D_G$ and $D_R$ obtained by the equations 1:

$$\begin{pmatrix} D_Y \\ D_M \\ D_C \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} D_B \\ D_G \\ D_R \end{pmatrix} \quad 3$$

That is, $$D_Y = a_{11}D_B + a_{12}D_G + a_{13}D_R \quad\quad 4\text{-}1$$
$$D_M = a_{21}D_B + a_{22}D_G + a_{23}D_R \quad\quad 4\text{-}2$$
$$D_C = a_{31}D_B + a_{32}D_G + a_{33}D_R \quad\quad 4\text{-}3$$

Each matrix coefficient (correction coefficient) $a_{ij}$ is set to a value so that the impure component of each color is cancelled, theoretically or statistically, according to the characteristics of an ink sheet to be used, a print paper to be used, and so on. In the first embodiment of FIG. 1, each matrix coefficient is held by a matrix holding means.

Figure 1:
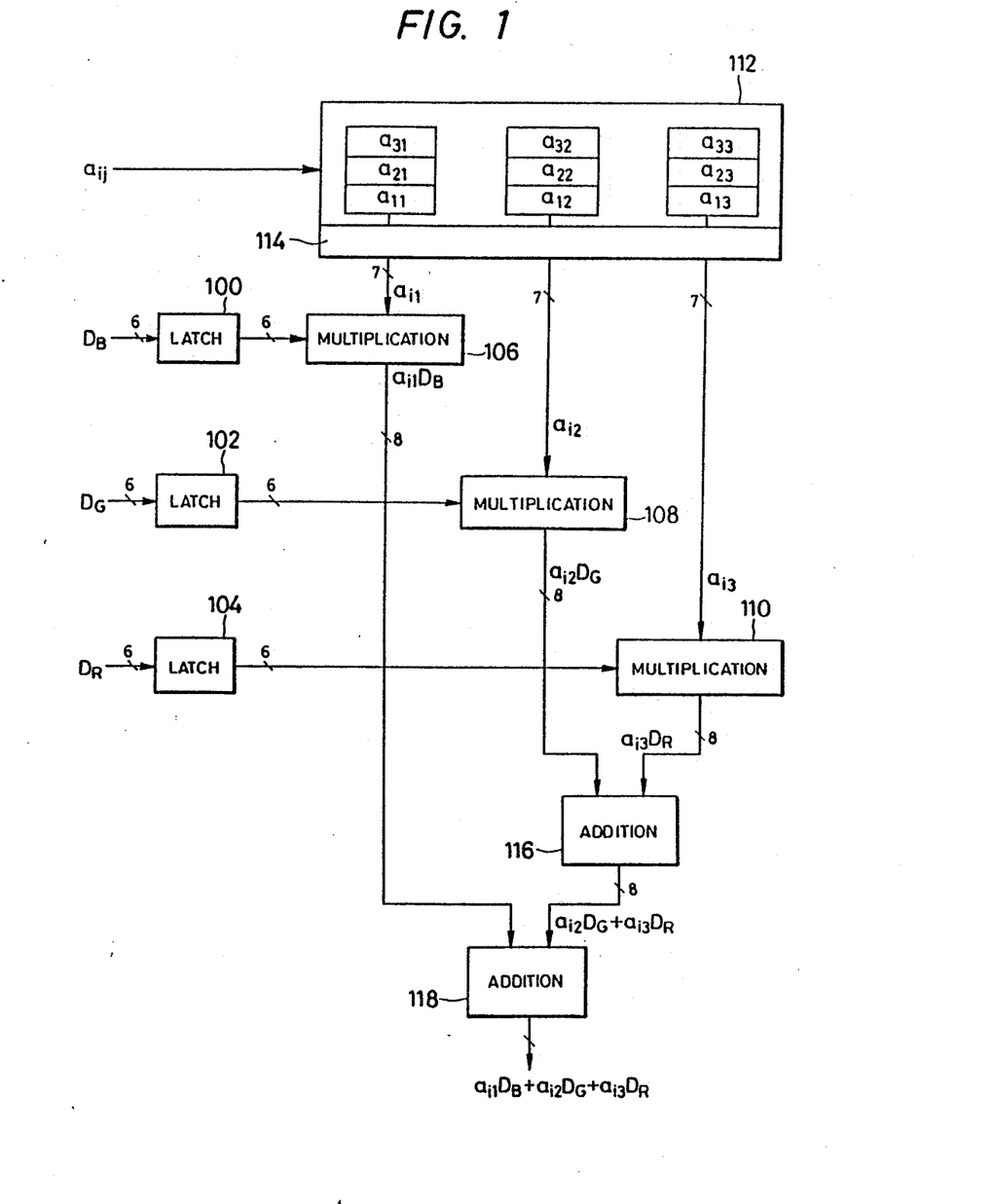
FIG. 1 is a block diagram illustrating the arrangement of a first embodiment of the color masking circuit according to the present invention.

For example, the datum $D_Y$ of the equation 4-1 is operated upon such that the matrix coefficients $a_{11}$, $a_{12}$ and $a_{13}$ are selected from the matrix coefficient holding means by a coefficient selecting means, and the data $D_B$, $D_G$ and $D_R$ are multiplied by the respective selected coefficients $a_{11}$, $a_{12}$ and $a_{13}$ by a multiplication circuit. The resulting data values are added to each other by an addition circuit to thereby obtain the datum $D_Y$ in accordance with the equation 4-1. The data $D_M$ and $D_C$ of equations 4-2 and 4-3 are calculated through similar operations.

The embodiments of the present invention now will be described with reference to the accompanying drawings.

FIG. 1 shows the arrangement of the first embodiment of the color masking circuit according to the present invention.

In FIG. 1, six bits of density data $D_B$ (blue), $D_G$ (green) and $D_R$ (red) to be subjected to color masking processing are latched by latch circuits 100, 102 and 104, respectively, and respectively applied to multiplication circuits 106, 108 and 110 through the respective output terminals of the latch circuits 100, 102 and 104. However, the predetermined 3×3 matrix coefficients $a_{11}$, $a_{12}$, ... $a_{33}$ described above are loaded into a matrix coefficient holding circuit 112 which is constituted by registers. Each coefficient $a_{ij}$ in matrix coefficient holding circuit 112 is formed by seven bits including one sign bit.

In order to calculate the datum $D_Y$ of the equation 4-1, the matrix coefficients $a_{11}$, $a_{12}$ and $a_{13}$ are selected by a matrix coefficient selecting circuit 114 and applied to the multiplication circuits 106, 108 and 110, respectively. The data $D_B$, $D_G$ and $D_R$ are then multiplied by coefficients $a_{11}$, $a_{12}$ and $a_{13}$ by the multiplication circuits 106, 108 and 110, respectively. The data of product $a_{12}D_G$ obtained by the multiplication circuit 108 and data of product $a_{13}D_R$ obtained by the multiplication circuit 110 then are added to each other by an addition circuit 116, and the resultant data of sum $a_{12}D_G + a_{13}D_R$ and the data of product $a_{11}D_B$ obtained by the multiplication circuit 106 are added to each other by an addition circuit 118 so that the 8-bit data of $D_Y = a_{11}D_B + a_{12}D_G + a_{13}D_R$ is produced.

Next, in order to obtain the datum $D_M$ of the equation 4-2, the matrix coefficients $a_{21}$, $a_{22}$ and $a_{23}$ are selected by the matrix coefficient selecting circuit 114 and applied respectively to the multiplication circuits 106, 108 and 110 through which the data of product $a_{12}D_G$, $a_{13}D_R$ and $a_{11}D_B$ were obtained as just described. Those data of product $a_{22}D_G$, $a_{23}D_R$ and $a_{21}D_B$ are added to each other by the addition circuits 116 and 118 so that the 8-bit data $D_M = a_{21}D_B + a_{22}D_G + a_{23}D_R$ is produced.

Next, in order to obtain the datum $D_C$ of the equation 4-3, the matrix coefficients $a_{31}$, $a_{32}$ and $a_{33}$ are selected by the matrix coefficient selecting circuit 114 and subjected to an operation similar to that described above through the multiplication circuits 106, 108 and 110 and the addition circuits 116 and 118 so that the 8-bit data $D_C = a_{31}D_B + a_{32}D_G$ and $a_{33}D_R$ is produced.

As described above, when a set of density data $D_R$, $D_G$ and $D_B$ of the RGB system is given, the 3×3 matrix operation according to the equations 4 is executed for those density data at a high speed using hardware so that the density data $D_Y$, $D_M$ and $D_C$ of the YMC system are produced sequentially.

Figure 2:
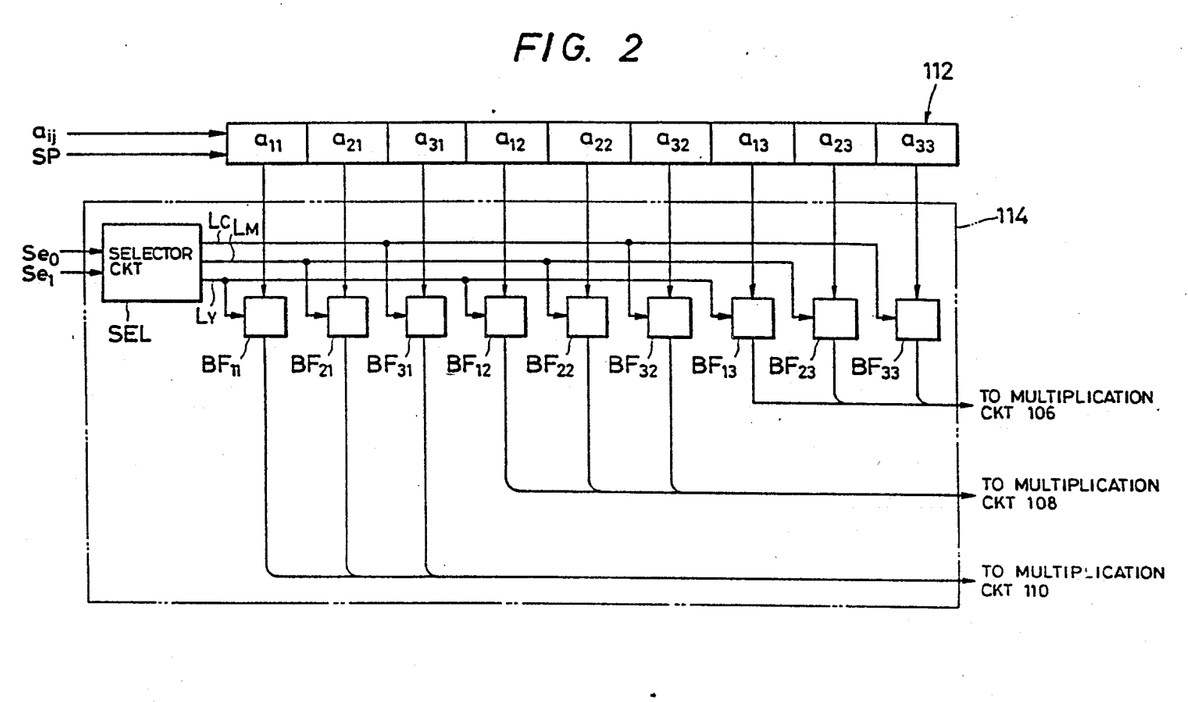
FIG. 2 is a block diagram illustrating a specific example of the arrangement of the matrix coefficient holding circuit 112 and the matrix coefficient selecting circuit 114 in FIG. 1.

FIG. 2 shows a specific example of an arrangement of the matrix coefficient holding circuit 112 and the matrix coefficient selecting circuit 114. The matrix coefficient holding circuit 112 is arranged in the form of a 63 (7×9) bit serial-input-and-parallel-output shift register so that the preset matrix coefficients $a_{ij}$ successively given in the order of $a_{33}$, $a_{23}$, ... $a_{21}$ and $a_{11}$ in serial bits are inputted (loaded) into predetermined positions of the shift register at the timing of a shift pulse SP outputted from the shift register in parallel bits.

The matrix coefficient selecting circuit 114 is constituted by tri-state buffers $BF_{ij}$ for respectively receiving the matrix coefficients $a_{ij}$ outputted in parallel from the matrix holding circuit 112, and a selector circuit SEL consisting of a decoder. Two-bit selection signals $se_0$ and $se_1$ for selecting the matrix coefficients are supplied to the selector circuit SEL. When the datum $D_Y$ is to be obtained as mentioned above, for example, the signals $se_0$ and $se_1$ (of "L", "L") are supplied to make only the output line $L_Y$ of the output lines $L_Y$, $L_M$ and $L_C$ of the selector circuit SEL become "H", thereby turning on the tri-state buffers $BF_{11}$, $BF_{12}$ and $BF_{13}$ with their control terminals connected to the output line $L_Y$ so that the corresponding matrix coefficients $a_{11}$, $a_{12}$ and $a_{13}$ are transferred to the respective output sides of the buffers $BF_{11}$, $BF_{12}$ and $BF_{13}$, and these coefficients are supplied to the multiplication circuits 106, 108 and 110, respectively. In the same manner, when the datum $D_M$ is to be obtained, the signals $se_0$ and $se_1$ take predetermined logic values to make only the output line $L_M$ of the selector circuit SEL become "H" so that the tri-state buffers $BF_{21}$, $BF_{22}$ and $BF_{23}$ supply corresponding matrix coefficients $a_{21}$, $a_{22}$ and $a_{23}$ to the multiplication circuits 106, 108 and 110, respectively. Further, when datum $D_C$ is to be obtained, only the output line $L_C$ of the selector circuit SEL is made "H" so that the tri-state buffers $BF_{31}$, $BF_{32}$ and $BF_{33}$ supply the corresponding matrix coefficients $a_{31}$, $a_{32}$ and $a_{33}$ to the multiplication circuits 106, 108 and 110, respectively.

Figure 3:
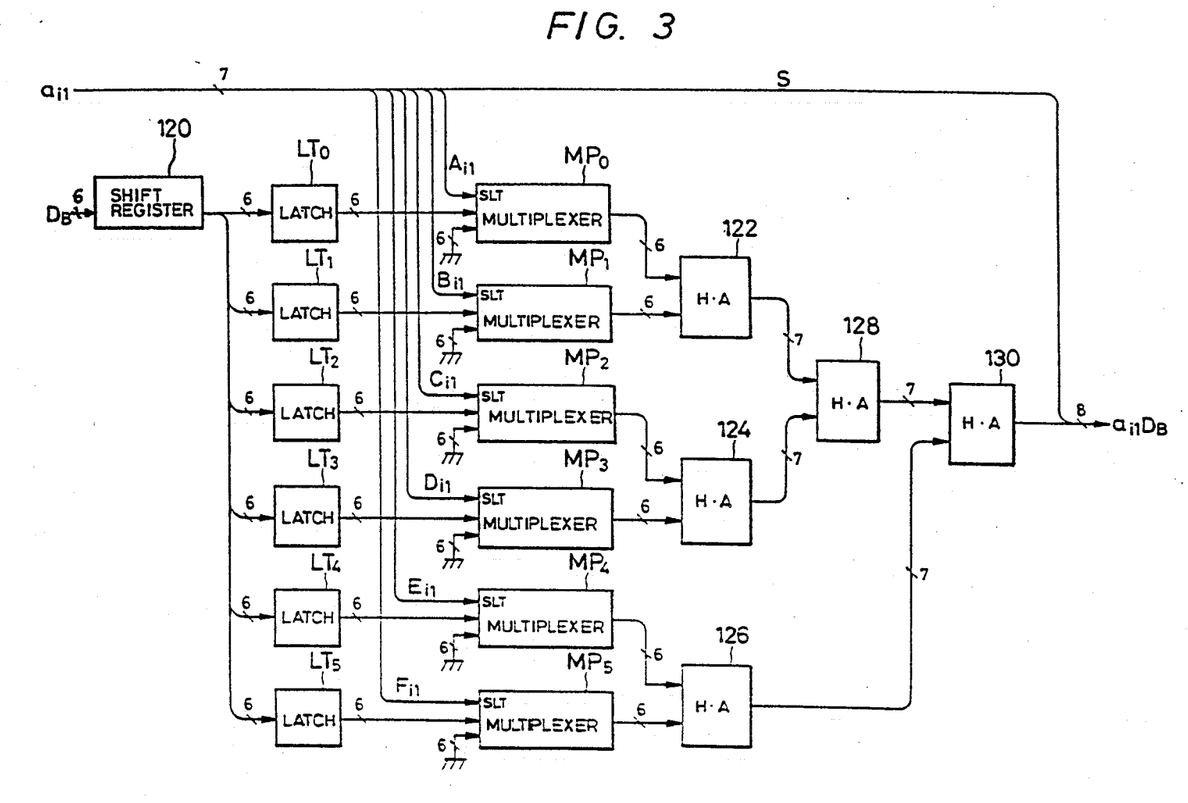
FIG. 3 is a block diagram illustrating a specific example of the arrangement of the multiplication circuit 106 for calculating $a_{ij}D_B$ in FIG. 1.
Figure 4:
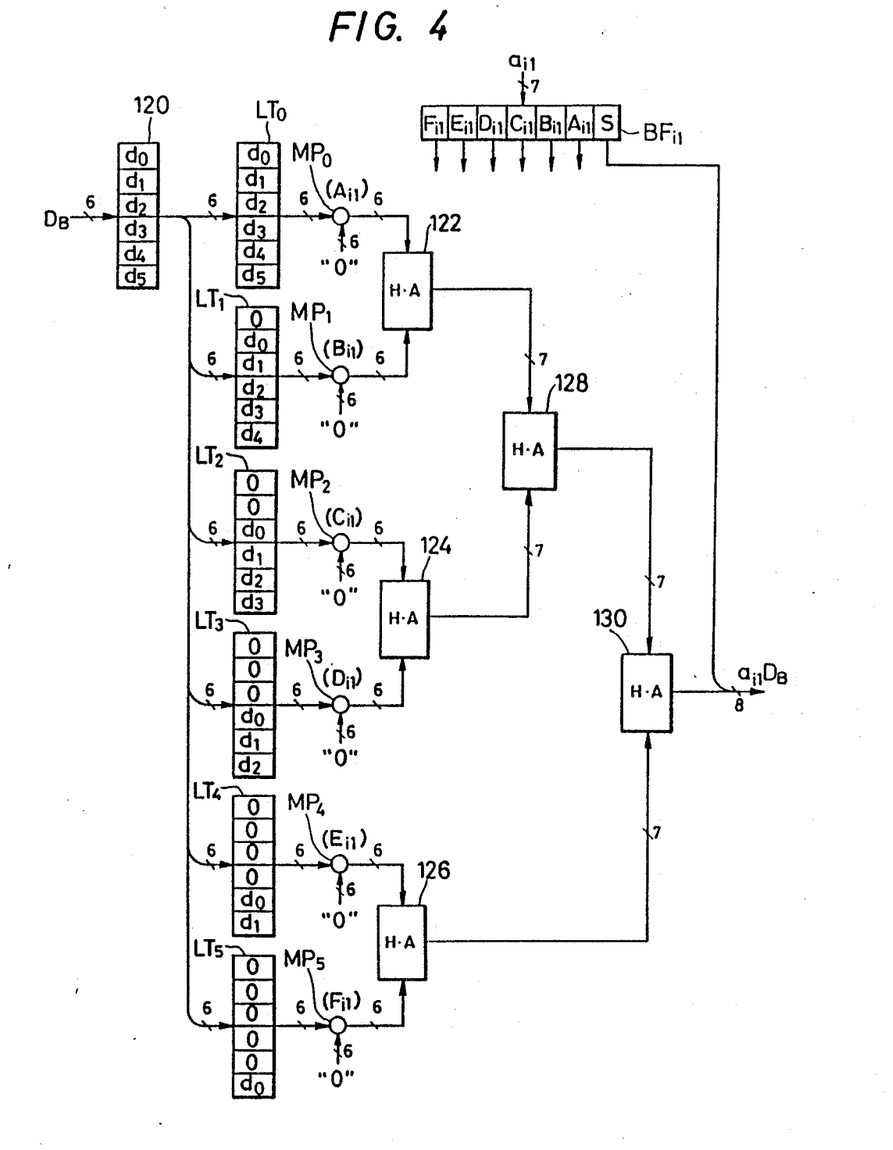
FIG. 4 is a block diagram illustrating a functional arrangement for explaining the operation of the multiplication circuit 106.

FIG. 3 shows a specific example of the multiplication circuit 106 for calculating the product $a_{il}D_B$, and FIG. 4 shows the functional arrangement for explaining the operation of the multiplication circuit 106.

The 6-bit density data $D_B$ (d0, d1, d2, d3, d4 and d5) is loaded into a 6-bit parallel-input-and-parallel-output shift register 120 through the latch circuit 100 (FIG. 1). After being loaded with the density data $D_B$, the shift register 120 makes each of its bits shift by one to the upper side (the overflow bit is cancelled). The contents (6 bits) in the respective stages of the shift register next are latched by latch circuits $LT_0 \sim LT_5$, respectively, and then applied to the respective input terminals of multiplexers $MP_0 \sim MP_5$. Six other bits of data with all the bits thereof made to be "0" (zero-level) are applied to other input terminals of the multiplexers $MP_n$. The upper six bits $A_{il}$, $B_{il}$, ... $F_{il}$ of the selected matrix coefficients $a_{il}$ (i=1,2,3) also are applied to the respective selector terminals SLT of the multiplexers $MP_n$. Each multiplexer $MP_n$ passes the one input (the data applied from the corresponding latch circuit $LT_n$) to the output terminal upon receiving a "1" bit at the selector terminal SLT, and passes the other input data ("0", "0",... "0") to the output terminal upon receiving a "0" bit at the selector terminal SLT.

The data respectively outputted from the multiplexers $MP_0$ and $MP_1$ next are added to each other by a half adder (H.A) 122 to thereby obtain 7-bit sum data. In the same manner, the data respectively outputted from the multiplexers $MP_2$ and $MP_3$ are added to each other by a half adder (H.A) 124, and the data respectively outputted from the multiplexers $MP_4$ and $MP_5$ are added to each other by a half adder (H.A) 126. Then, the sum data respectively obtained by the half adders 122 and 124 as the results of addition are added to each other by a half adder (H.A) 128, and the sum data obtained by the half adder 128 and the sum data obtained by the half adder 126 are added to each other by a half adder (H.A) 130. Then, a sign bit S of the matrix coefficient $a_{il}$ is added to the sum data obtained by the half adder 130. The 8-bit data thus obtained at the output of the half adder 130 is the data $a_{il}D_B$ which is the resultant product obtained by multiplying the density datum $D_B$ by the matrix coefficient $a_{il}$.

Though description has been made above as to the arrangement and operation of the multiplication circuit 106, it is a matter of course that the multiplication circuits 108 and 110 have the same arrangement and produce the products $a_{i2}D_G$ and $a_{i3}D_R$, respectively, by an operation similar to the multiplication circuit 106.

Figure 5:
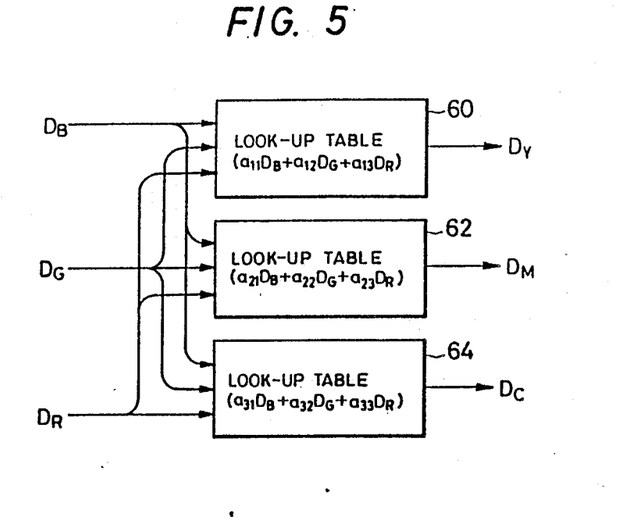
FIG. 5 is a block diagram illustrating the arrangement of a second embodiment of the color masking circuit according to the present invention.

FIG. 5 shows the arrangement of a second embodiment of the color masking circuit according to the present invention. In this embodiment, look-up tables 60, 62 and 64 constituted by ROMs are used, and the density data $D_B$, $D_G$ and $D_R$ are applied in parallel, 18 bits in total, as a variable (address) to each of the look-up tables 60, 62 and 64. In the respective look-up tables 60, 62 and 64, the calculated values of the equations 4 corresponding to all of the possible values of input data (18 bits) are stored in the predetermined addresses of the ROMs. When the density data $D_B$, $D_G$ and $D_R$ are inputted, the 6-bit density data $D_Y$, $D_M$ and $D_C$ corresponding to those input data $D_B$, $D_G$ and $D_R$ are read out.

Figure 6:
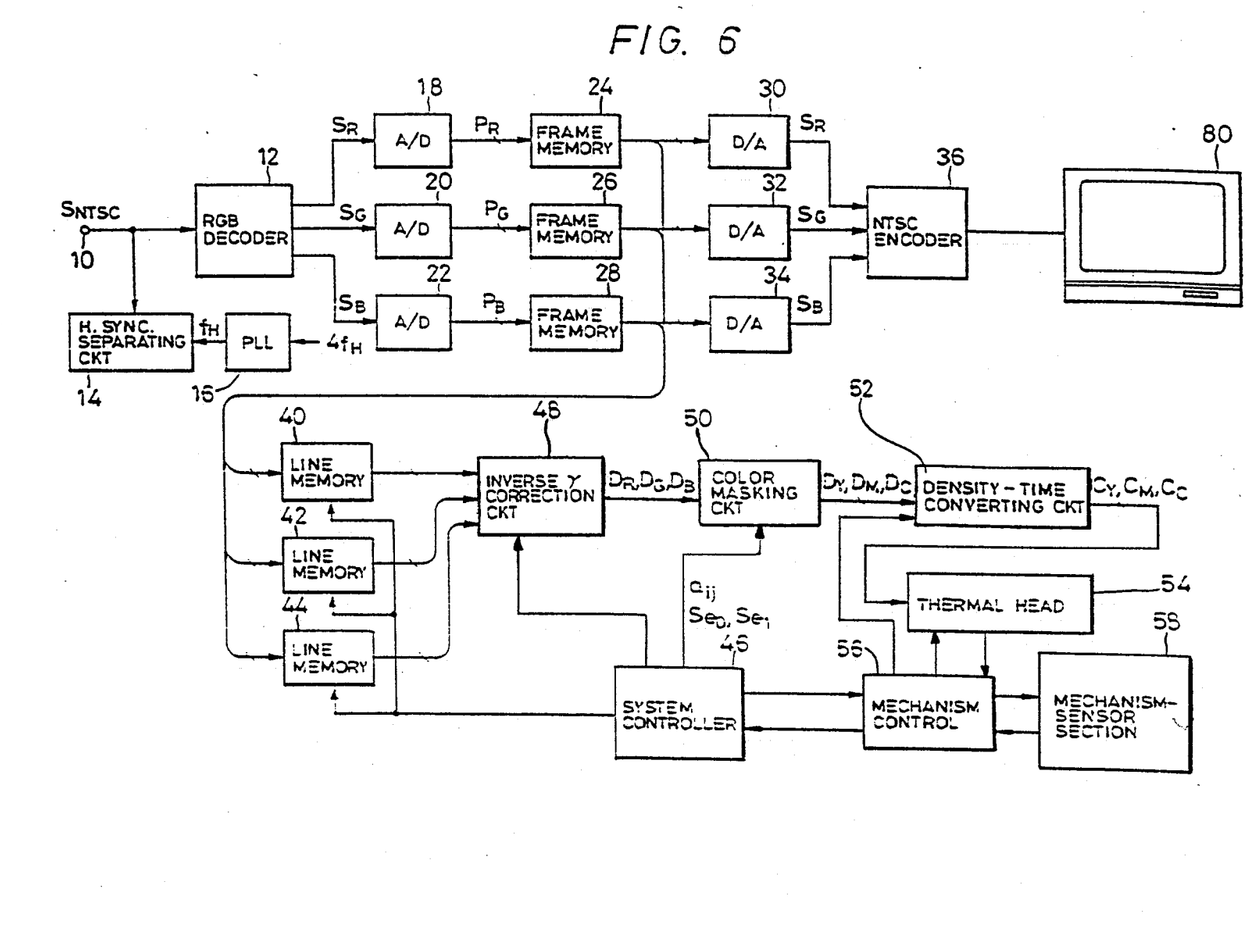
FIG. 6 is a block diagram illustrating the main arrangement of a color video printer with a thermal transfer system which employs the color masking circuit according to the present invention.

FIG. 6 shows the main arrangement of a color video printer of a thermal transfer system which employs the foregoing color masking circuit according to the present invention.

A color television video signal of a standard system constituting a television picture, for example, a color television video signal $S_{NTSC}$ of an NTSC system is applied to an input terminal 10. The television video signal $S_{NTSC}$ is decoded into primary color video signals $S_R$ (red), $S_G$ (green) and $S_B$ (blue) by a RGB decoder 12. The primary color video signals $S_R$, $S_G$ and $S_B$ then are converted into digital video signals, that is, picture elements $P_R$, $P_G$ and $P_B$ are digitized by A/D converters 18, 20 and 22 at a predetermined sampling rate (for example, at a frequency four times as high as the frequency of a color sub-carrier) and with a predetermined quantizing bit number (for example, 6 bits). The picture elements $P_R$, $P_G$ and $P_B$ are stored respectively in frame memories 24, 26 and 28 for every frame. At that time, the respective 6-bit picture elements $P_R$, $P_G$ and $P_B$ are written-in in the order corresponding to the raster scanning of the television picture. The television video signal $S_{NTSC}$ is supplied also to a horizontal synchronization separating circuit 14, which synchronizes the horizontal synchronizing signal to the local horizontal synchronizing signal generated by phase locked loop 16.

For the purpose of a still picture monitor, one-frame picture elements $P_R$, $P_G$ and $P_B$ stored in the frame memories 24, 26 and 28 are read out in the order corresponding to the raster scanning of the television picture, and they are restored into the analog primary color video signals $S_R$, $S_G$ and $S_B$ by D/A converters 30, 32 and 34, respectively, and then restored into the television video signal $S_{NTSC}$ by an NTSC encoder 36, before being transferred to a monitor display 80. If the display 80 has an RGB terminal, the primary color video signals $S_R$, $S_G$ and $S_B$ are directly transferred without passing through the encoder 36.

For making a hard copy of the television picture, the picture elements are read one line after another from the first line of the memory cells of the frame memories 24, 26 and 28, and are respectively latched in line memories 40, 42 and 44. The one-line color picture elements outputted from the respective line memories 40, 42 and 44 are input into an inverse gamma correction circuit 48 so as to be subjected to inverse gamma correction. Moreover, in the circuit 48, the above-mentioned equations 1 are executed by a digital logarithmic operator so that the density data $D_B$, $D_G$ and $D_R$ are produced. Those density data $D_B$, $D_G$ and $D_R$ then are supplied to a color masking circuit 50 according to the present invention as described above, in which the operation of the above-mentioned equations 4-1 to 4-3 are sequentially executed.

Corrected density data $D_Y$, $D_M$ and $D_C$ produced from the color masking circuit 50 are supplied to a density-to-time converting circuit 52. In the density-to-time converting circuit 52, the density information of the respective density data $D_Y$, $D_M$ and $D_C$ is converted into gradation data $C_Y$, $C_M$ and $C_C$ for instructing the heat transfer time (the current conduction time to a heating resistor) for every picture element. That is, in the thermal transfer system shown, the period of time of current conduction to each heating resistor (printing element) of a thermal head (printing head) 54 is controlled by applying a constant voltage to each heating resistor so as to give proper gradation to the heating energy of the resistor to consequently give proper gradation to the quantity of ink transferred and hence to the density of the picture. The period of time of current conduction to the respective heating resistors corresponds to the density information of the respective density data.

Figure 7:
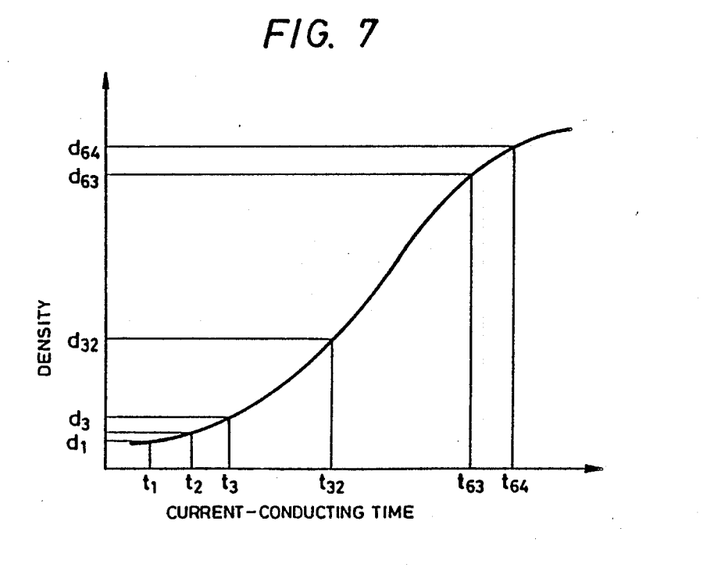
FIG. 7 is a diagram illustrating a current conduction time vs. density characteristic curve to be used in the density gradation system of the present invention.

FIG. 7 shows an applying time vs. density characteristic curve to be used in the density gradation system of the present invention. The density with a gradation level $d_1$ is obtained when the voltage is applied to the heating resistor for the current conduction time $t_1$ equivalent to a unit current conduction time $\Delta t$, and the density with a gradation level $d_2$ is obtained when the voltage is applied for the current conduction time $t_2$, which is two times as long as the unit current conduction time $\Delta t$. In this example, a maximum gradation level $d_{64}$ in the vicinity of the saturation density is obtained when the voltage is applied for the current conduction time $t_{64}$, which is sixty-four times as long as the unit current conduction time $\Delta t$.

The one line gradation data $C_Y$, $C_M$ and $C_C$, corresponding to the respective density data $D_Y$, $D_M$ and $D_C$, are supplied from the density-to-time converting circuit 52 to the thermal head 54 in a predetermined order, and the heating resistors aligned on one line generate heat for the time instructed by the corresponding gradation data $C_Y$, $C_M$ and $C_C$ so that picture elements (recording dots) corresponding to those of the television picture are printed on one printing line.

The pictures of the respective colors (Y, M, C) are not printed at the same time, but are sequentially printed piece by piece in synchronism with the changing-over of ink sheets. Therefore, the gradation data $C_Y$, $C_M$ and $C_C$ are sequentially supplied to the thermal head 54 for one piece after another. Since the color impurities in ink sheets and the like have been eliminated (corrected) by color masking in the manner described above, the printed picture is superior in color reproducibility.

A system controller 46 controls the operation of the whole printer, and in the case where the color masking circuit of the above-mentioned first embodiment is included in the printer, the system controller 46 gives data such as the preset masking coefficients $a_{ij}$ and the selector signals $se_0$ and $se_1$ to the color masking circuit 50. A mechanism control section 56 controls the operation of a printer mechanism section, and a mechanism sensor section 58 includes a head feed mechanism, a paper feed mechanism and various sensors. However, the application of the color masking circuit according to the present invention is not limited to the above-mentioned color video printer.

As described above, according to the present invention a matrix operation for color masking processing can be achieved at a high speed by means of hardware. In the first embodiment, for example, the circuit is constituted by multiplication and addition means. Moreover, if the color masking circuit according to the present invention is produced in the form of an LSI, the circuit can be constituted by few parts. Further, in a color video printer using the masking circuit according to the present invention, it is possible to obtain printed pictures in which impurities of color materials are cancelled so as to make the color reproducibility high.

Although only a few exemplary embodiments of this invention have been described in detail above, those skilled in the art will readily appreciate that many modifications are possible in the preferred embodiments without materially departing from the novel teachings and advantages of this invention. Accordingly, all such modifications are intended to be included in this invention as defined by the following claims.

What is claimed is:

1. A color masking circuit in a color printer for performing color masking processing upon first density data indicating the color densities of first color picture elements, comprising:
   matrix coefficient holding means for holding predetermined matrix coefficients corresponding to a range of possible colors of desired output density data, said predetermined matrix coefficients compensating for colors of color materials used in said color printer;
   matrix coefficient selecting means for selecting predetermined matrix coefficients from said matrix coefficient holding means according to a color of desired output density data;
   multiplication circuits for multiplying each color density of said first density data by one of said corresponding selected matrix coefficients; and
   addition means for adding the data obtained as resultant products from said multiplication circuits to each other to thereby produce said desired output density data.

2. A color masking circuit in a color printer for performing color masking processing upon density data indicating the density of color picture elements, comprising:
   input means for receiving density data in the form of parallel input data;
   at least one look-up table in which matrix operation values for masking according to possible values of said density data are stored at predetermined addresses, said matrix operation values compensating for colors of color materials used in said color printer; and
   output means for outputting a selected matrix operation value as desired output density data corresponding to said density data, said density data being used as an address to said at least one look-up table to select said selected matrix operation value.

3. A color printer for printing a color television picture, comprising:
   conversion means for converting picture element data forming a television picture into first density data having corresponding color densities;
   a color masking circuit for performing color masking processing upon said first density data to thereby output desired output density data, comprising:
   matrix coefficient holding means for holding predetermined matrix coefficients, said predetermined matrix coefficients compensating for colors of color materials used in said printing,
   matrix coefficient selecting means for selecting predetermined matrix coefficients from said matrix coefficient holding means according to a color of desired output density data,
   multiplication circuits for multiplying each color density of said first density data by one of said corresponding selected matrix coefficients, and addition means for adding the data obtained as resultant products from said multiplication circuits to each other to thereby produce said desired output density data;
a density-to-time conversion circuit for converting said desired output density data into gradation data for instructing density gradation of each picture element to be printed; and
print driving means for driving printing according to said gradation data to thereby make a printed picture corresponding to said television picture.

4. A color picture for printing a color television picture, comprising:
conversion means for converting picture element data forming a television picture into density data;
a color masking circuit for performing color masking processing upon said density data to thereby output desired output density data, comprising:
input means for receiving density data in the form of parallel input data,
at least one look-up table in which matrix operation values for masking according to possible values of said density data are stored at predetermined addresses, said matrix operation values compensating for colors of color materials used in said printing, and
output means for outputting a selected matrix operation value as desired output density data corresponding to said density data, said density data being used as an address to said at least one look-up table to select said selected matrix operation value;
a density-to-time conversion circuit for converting said desired output density data into gradation data for instructing density gradation of each picture element to be printed; and
print driving means for driving printing according to said gradation data to thereby make a printed picture corresponding to said television picture.

* * * * *